United States Patent [19]

Johnson

[11] Patent Number: 4,571,076
[45] Date of Patent: Feb. 18, 1986

[54] BLOOMING AUTO COLLIMATOR

[75] Inventor: William M. Johnson, Sudbury, Mass.

[73] Assignee: The Charles Stark Draper Laboratory, Cambridge, Mass.

[21] Appl. No.: 512,203

[22] Filed: Jul. 8, 1983

[51] Int. Cl.4 .............................................. G01B 11/26
[52] U.S. Cl. ..................................... 356/152; 350/354
[58] Field of Search ................. 356/152, 153; 350/354

[56] References Cited

U.S. PATENT DOCUMENTS

| 3,434,779 | 3/1969 | Damen et al. | 372/103 |
|---|---|---|---|
| 3,999,858 | 12/1976 | Hernqvist et al. | 356/152 |
| 4,146,329 | 3/1979 | King et al. | 356/152 |

Primary Examiner—S. C. Buczinski
Assistant Examiner—Linda J. Wallace
Attorney, Agent, or Firm—Weingarten, Schurgin, Gagnebin & Hayes

[57] ABSTRACT

A blooming auto collimator is disclosed for aligning optical components or optical beams along a reciprocal optical path. A blooming cell is positioned along the reciprocal optical path intermediate first and second spaced-apart locations to be aligned. A comparatively high-power laser source is positioned at one of the locations, and is operative to provide a comparatively high-energy beam of coherent light along the optical path through the blooming medium and toward the other location. A comparatively low-energy source of coherent light is positioned at the other location, and is operative to provide a comparatively low-energy beam of coherent light through the blooming medium and back along the reciprocal optical path. The comparatively high-energy beam thermally excites the blooming medium, producing therealong a thermal gradient having the characteristics of a negative optical lens. In the case of colinear alignment of the high and low-energy beams, the low-energy beam is symmetrically diverged by the negative lens. In the case of relative colinear misalignment of the high and low-energy beams, the low-energy beam is asymmetrically diverged by the negative lens by a large number multiple of the actual relative colinear misalignment. A sensor responsive to the low-energy beam is operative to provide an extremely sensitive signal indication of relative colinear alignment. The comparatively low-energy beam may be provided as a reflection of the high-energy beam. The blooming medium may be any suitable fluid in either liquid or gas phase. The comparatively high-energy beam of coherent light is preferably focussed at a point along the axis of the blooming cell. Means are provided at the second location for absorbing the comparatively high-energy beam.

20 Claims, 5 Drawing Figures (TYP. PRIOR ART)

ALIGNED LOW POWER
BEAM FROM CELL

LOW POWER BEAM FROM
CELL WITH MISALIGNED
HIGH POWER

BLOOMING AUTO COLLIMATOR

FIELD OF THE INVENTION

This invention is drawn to the field of optics, and more particularly, to a novel blooming auto collimator.

BACKGROUND OF THE INVENTION

In many applications including optical alignment, surveying, tracking, and pointing, and remote sensing, optical auto collimators are employed to provide a signal indication of the relative alignment of outgoing and return optical and laser beams, and of the relative alignment of optical and other components. The heretofore known laser auto collimators typically employ a collimated laser beam that is directed from one location along an optical path toward a spatially remote, second location. The collimated laser beam is incident upon a mirror or other reflecting surface at the second location, and is reflected therefrom back upon a sensor at the first location that is operative to provide a signal indication of the azimuthal and/or elevational deviation of the return beam from optical null. However, the utility of the known auto collimators is limited by the spatial resolution sensitivity of the sensor, which often presents a material limitation in applications calling for extremely precise alignment. In addition, air convection and other medium phenomenon induce undesirable distortions in both the outgoing and the reflected return beams that can produce erroneous signal indications of relative alignment.

SUMMARY OF THE INVENTION

The blooming auto collimator of the present invention overcomes these and other disadvantages and contemplates means operative to greatly amplify the actual relative misalignment in a manner that is substantially free of undesirable propagation medium-induced distortions. The blooming auto collimator of the present invention includes an elongated misalignment amplifier having a blooming medium that is positioned along an optical path defined between first and second spaced-apart locations, a source of comparatively high-energy coherent light at the first location for directing a beam of converging rays of comparatively high-energy coherent light along the optical path toward the second location and focussed at a point along the long axis of the blooming medium, a source of comparatively low-energy coherent light at the second location for directing a beam of collimated rays of comparatively low-energy coherent light along the optical path reciprocally back through the blooming medium toward the first location, and a sensor at the first location operative in response to the beam of comparatively low-energy coherent light for providing an extremely sensitive signal indication of the amplified relative colinear misalignment of the high and of the low-energy beams along the reciprocal optical path. The high-energy beam heats the blooming medium along its path, producing a density gradient therealong having a central, comparatively low-density region, and a surrounding, comparatively high-density region that defines a negative lens. In the case where the high and the low-energy beams are colinearly aligned along the reciprocal optical path, the low-energy beam traverses the central, comparatively low-density region and is symmetrically diverged thereby producing a symmetrical annular image on the sensor that is indicative of colinear alignment. In the case where the comparatively high-energy and low-energy beams are even slightly out of relative colinear alignment along the reciprocal optical path, the comparatively low-energy beam traverses both the central low-density region and the surrounding high-density region of the blooming medium. The negative lens defined by the density gradient in the misalignment amplifier deviates the low-energy beam by a large number multiple of the actual relative misalignment, distorts the low-energy beam, and produces a crescent-shaped image on the sensor whose centroid is shifted much more than the actual relative misalignment between the two beams. The blooming medium can be any suitable fluid in either liquid or gas phase. Both pulsed and continuous operation of the high and the low-energy beams can be employed. A reflector can be provided at the second location for providing a return beam back through the misalignment amplifier.

BRIEF DESCRIPTION OF THE DRAWINGS

Other advantages and features of the present invention will become apparent as the invention becomes better understood by referring to the following exemplary and nonlimiting detailed description of the preferred embodiment, and to the drawings, wherein.

DETAILED DESCRIPTION OF THE PREFERRED EMBODIMENT

Figure 1:
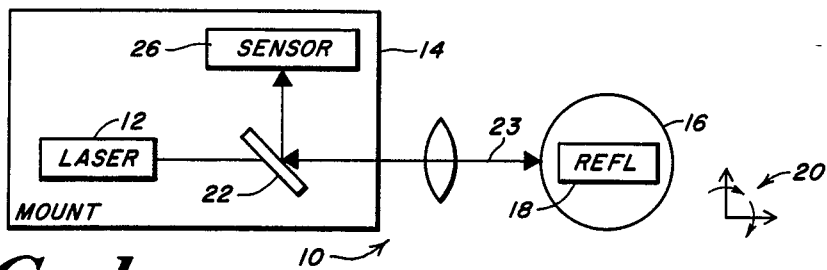
FIG. 1 is a block diagram illustrating a typical prior art auto collimator.

Referring now to FIG. 1, generally designated at 10 is a block diagram illustrating a prior art laser auto collimator 10. The heretofore known auto collimator 10 includes a laser 12 mounted to a platform 14. A platform 16 to be aligned is in spaced-apart relation to the platform 14. A reflector 18, rotatable about orthogonal axes generally designated 20, is mounted to the platform 16. To obtain an indication of the relative alignment of the platforms 14, 16, a laser beam is directed by the laser source 12 through a beam splitter 22, mounted to the platform 14, and onto the reflector 18 over an optical path 23, and is reflected therefrom back toward the platform 14 at an angle that depends upon the relative orientation of the reflector 18 about the axes 20. The reflected light is reflected by the beam splitter 22 onto a sensor 26, typically a quadrant cell, that is mounted to the platform 14. The position of the image of the reflected beam on the sensor 26 relative to optical null provides an indication of the relative alignment of the platforms 14, 16. As discussed in the background of the invention, however, the utility of such systems is limited, among other things, by the spatial resolution sensitivity of the sensor 26, and by turbulence and other undesirable medium phenomenon in the propagation path 23 between the two platforms 14, 16.

Figure 2:
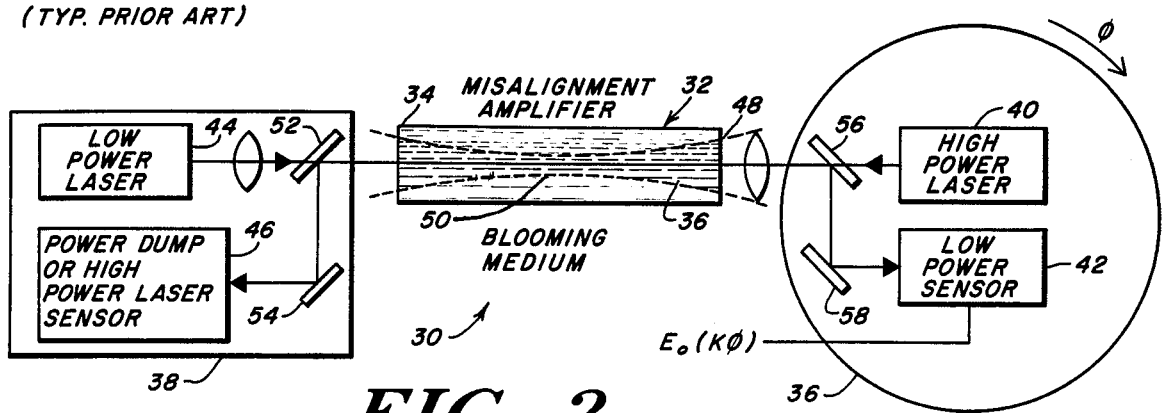
FIG. 2 is a block diagram illustrating a blooming auto collimator according to the present invention.

Referring now to FIG. 2, generally shown at 30 is a block diagram illustrating a novel blooming auto collimator according to the present invention. The blooming auto collimator 30 includes a misalignment amplifier generally designated 32 having a housing 34 that defines an enclosed chamber. A blooming medium 36 is disposed in the chamber. The blooming medium 36 preferably includes water, although it will be appreciated that any other suitable fluid in liquid or gas phase can be employed as well.

The misalignment amplifier 32 is positioned intermediate a first platform 36 and a second platform 38 that are to be aligned. A high-power laser 40 is mounted to the platform 36, and a low-power sensor 42 is mounted to the platform 36. A low-power laser 44 is mounted to the platform 38, and either a power dump, or a high-power laser sensor 46, is mounted to the platform 38.

The high-power laser 40 is operative in the usual manner to provide a beam 48 of converging rays of comparatively high energy coherent light through the misalignment amplifier and toward the platform 38. The beam 48 is preferably prefocussed at a point 50 in the blooming medium 36 along the long axis of the misalignment amplifier 32. The rays 48 define an optical path between the platforms 36, 40 which converges to the point 50, and diverges thereafter due to the blooming effect of the blooming medium 36. The beam of comparatively high-power coherent light 48 exits the misalignment amplifier 32 and is incident on a beam splitter 52 mounted to the platform 38. The splitter 52 deviates the beam 48 in the direction of a mirror 54 that is mounted to the platform 38. The mirror 54 deviates the comparatively high-energy laser beam into the power dump 46.

The low-power laser 44 is operative in the usual manner to provide a comparatively low-energy beam of collimated coherent light through the misalignment amplifier 32 and toward the platform 36. The beam of collimated coherent light provided by the low-power laser 44 passes through the blooming medium 36 of the amplifier 32, and is incident on a beam splitter 56, mounted to the platform 36, which deviates the low-energy beam onto the surface of a mirror 58, also mounted to the platform 36. The low-power beam is deviated by the mirror 58 onto the low-power sensor 42. Preferably, the output beams of the high and the low-power lasers 40, 44 are continuously generated, although the output beams of one or both may be pulsed without departing from the inventive concept.

Figure 3:
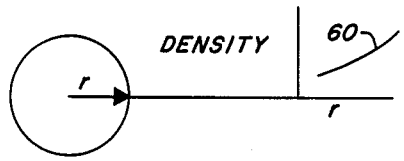
FIG. 3 is a schematic diagram illustrating the operation of the blooming medium of the blooming auto collimator according to the present invention.

In traversing the misalignment amplifier 32, the beam of converging rays of coherent, comparatively high-energy laser light 48 thermally excites the blooming medium 36 in its path. The heated medium expands, producing an elongated, central column of comparatively low-density fluid that is surrounded by an elongated annulus of cooler and comparatively higher-density fluid. As shown by a curve 60 in FIG. 3, plotted in a Cartesian coordinate system where fluid density is the ordinate and radial position in the misalignment amplifier 32 is the abscissa, a density gradient is produced in the blooming medium 36. The optical refractive index of the blooming medium depends on its density. The density gradient 60 produces a negative lens in the blooming medium 36 of the misalignment amplifier 32.

Figure 4:
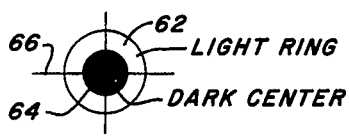
FIG. 4 is a schematic diagram illustrating the image of the low-energy beam on the sensor in the case where the high and low-power beams are in colinear alignment of the blooming auto collimator according to the present invention.

In the case where the beam of collimated rays of coherent, comparatively low-energy laser light produced by the low-power laser 44 traverses the blooming medium 36 in the misalignment amplifier 32 in colinear alignment with the optical path traversed by the beam of converging rays of coherent, comparatively high energy laser light 48, the low-power beam is substantially uniformly refracted by the comparatively low-density region in the blooming medium and symmetrically diverges, forming an annular beam. The annular beam is deviated by the members 56, 58 onto the low-power sensor 42. As illustrated in FIG. 4, the image of the low-power beam on the sensor 42 when the low and high-power beams are colinearly aligned is an annulus of light 62 surrounding a central, dark region 64 that is centered on a null reference position designated by the coordinates 66.

Figure 5:
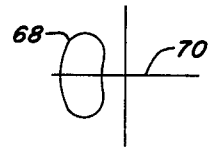
FIG. 5 is a schematic diagram illustrating the image on the sensor in the case where the high and the low-power beams are out of colinear alignment of the blooming auto collimator according to the present invention.

In the case where the low and the high-power beams are in relative colinear misalignment, the low-power beam traverses both the low and high-density regions of the blooming medium 36 along the length thereof. The negative lens effect of the blooming medium nonuniformly refracts and asymmetrically diverges the low-power beam outwardly by a large number multiple of the actual relative colinear misalignment, thereby amplifying the actual relative spacial misalignment. As shown in FIG. 5, the image of the low-power beam on the sensor 42 in this case is distorted from the annulus 62 (FIG. 4) into a crescent shape 68, where the centroid of the crescent 68 is displaced from a null reference position 70 by a large number multiple of the actual relative misalignment. The sensor 42 thereby is capable of resolving extremely small relative misalignments of the high and low-power laser beams, and provides an extremely sensitive signal indication of the relative misalignment. It is to be noted that any other suitable means for providing a low-power beam reciprocally back along the long axis of the misalignment amplifier, such as a reflecting surface at the second location, can be employed as well without departing from the inventive concept.

It will be appreciated that many modifications of the presently disclosed invention will become apparent to those skiled in the art without departing from the scope of the appended claims.

What is claimed is:

1. A blooming auto collimator for providing an extremely sensitive signal indication of the degree of colinear misalignment of a comparatively high and a comparatively low-energy optical beam that each traverse a common, but reciprocal, optical path, comprising:
   a housing defining a chamber positioned along the common optical path;
   a blooming medium disposed in the chamber; and
   means operative in response to the comparatively low-energy beam to provide an extremely sensitive indication of the degree of coliner alignment of the comparatively low and the comparatively high-energy optical beams.

2. The invention of claim 1, wherein said blooming medium is a fluid.

3. The invention of claim 2, wherein said fluid is a gas.

4. The invention of claim 2, wherein said fluid is a liquid.

5. The invention of claim 4, wherein said liquid includes water.

6. The invention of claim 1, wherein said comparatively high and comparatively low-energy optical beams are coherent laser beams.

7. The invention of claim 6, wherein said comparatively high-energy coherent laser beam is focussed at a point within the blooming medium.

8. The invention of claim 6, wherein said comparatively low-energy beam is provided by a source of comparatively low-energy laser light.

9. The invention of claim 6, wherein said comparatively low-energy beam is provided as a reflection of said comparatively high-energy beam.

10. A blooming auto collimator, comprising:
 a first laser source for directing a beam of comparatively high-energy coherent light along an optical path;
 a second laser source for directing a comparatively low-energy beam of coherent light reciprocally back along said optical path;
 a misalignment amplifier having a blooming medium positioned along said optical path; and
 means operative in response to said comparatively low-energy coherent light beam for providing an extremely sensitive signal indication of the relative coaxial alignment of said comparatively high and said comparatively low-energy coherent light beams along said reciprocal optical path.

11. The invention of claim 10, wherein said misalignment amplifier includes a housing defining a chamber, wherein said blooming medium is disposed in said chamber, and wherein said blooming medium is a fluid.

12. The invention of claim 11, wherein said blooming medium is a gas.

13. The invention of claim 11, wherein said blooming medium is a liquid.

14. The invention of claim 13, wherein said liquid includes water.

15. The invention of claim 10, wherein said source of comparatively high-energy laser light is focussed at a point within the blooming medium along the long axis of the misalignment amplifier.

16. The invention of claim 10, wherein at least one of said comparatively high and comparatively low-energy coherent light beams are continuously operated.

17. The invention of claim 10, wherein at least one of said comparatively high and said comparatively low-energy coherent light beams are pulsed in operation.

18. A blooming auto collimator, comprising:
 first means at a first location for providing a comparatively high-energy beam of coherent light along an optical path;
 second means at a spaced-apart second location for providing a beam of comparatively low-energy coherent light reciprocally back along the optical path and toward the first location; and
 third means, positioned along the common and reciprocal optical path and operative in response to said comparatively high-energy beam of coherent light, for providing a negative lens, said negative lens operative to amplify by a large number multiple the actual relative colinear misalignment of the high and the low-power beams along the reciprocal optical path and.

19. The invention of claim 17, wherein said third means includes a blooming cell.

20. The invention of claim 17, further including a sensor positioned at said first location and operative in response to said comparatively low-energy beam to provide an extremely sensitive signal indication of the degree of relative misalignment of said comparatively high and low-energy beams.

* * * * *